United States Patent [19]

Geary et al.

[11] 3,994,541

[45] Nov. 30, 1976

[54] BEARING ASSEMBLY

[75] Inventors: Carl H. Geary, Greensburg; Leonard P. Damratowski, Monroeville; Vijay K. Sood, Murrysville, all of Pa.

[73] Assignee: Carrier Corporation, Syracuse, N.Y.

[22] Filed: Oct. 3, 1975

[21] Appl. No.: 619,327

[52] U.S. Cl. .................................. 308/9; 308/15; 308/122
[51] Int. Cl.² ........................................ F16C 13/00
[58] Field of Search ................. 308/9, 15, 22, 36.1, 308/36.3, 121, 122

[56] References Cited

UNITED STATES PATENTS

| 3,456,992 | 7/1969 | Kulina ................................ 308/9 |
| 3,473,853 | 10/1969 | Goss et al. ......................... 308/15 |

Primary Examiner—M. H. Wood, Jr.
Assistant Examiner—Gene A. Church

[57] ABSTRACT

Apparatus and method for assembling a flexible damped bearing within a rotary machine for properly locating the various bearing components in reference to the machine shaft, whereby the bearing will respond to the shaft in a predetermined manner.

10 Claims, 3 Drawing Figures

BEARING ASSEMBLY

BACKGROUND OF THE INVENTION

This invention relates to apparatus and method of assembling and locating the components of a flexible damped bearing with respect to the shaft of a rotary machine, such as a turbine or a compressor.

The term flexible damped bearing, as herein used, refers to an assembly wherein the bearing is mounted within a movable support and the support suspended from the machine frame upon a series of resilient spring-like flexure elements. A fluid squeeze film is also created between the resiliently suspended bearing support and the stationary frame of the machine. The combined effect of the resilient springs and the fluid squeeze film is to provide the bearing system with a tuned response capable of attenuating shaft induced vibrations encountered at resonant frequencies. For a more complete disclosure relating to the design and implementation of flexible damped bearings, reference is had to U.S. Pat. No. 3,456,992 and NASA Technical Note D-7892, published February 1975. Although the flexible damped bearing is known to be an ideal device for isolating the bearing system from a machine frame, its use, particularly in heavy machinery, has heretofore been limited because of the many problems involved in assembling and aligning the various bearing components. Misalignment of bearing components results in nonuniform preloading of the resilient springs, producing a nonsymmetrical response in the spring system and deformation of the squeeze film cavity. As a consequence, the bearing fails to perform as predicted. Setup and assembly problems become more pronounced as the mass of the rotor structure increases.

SUMMARY OF THE INVENTION

It is therefore an object of the present invention to facilitate the assembling and setting up of a flexible damped bearing in a heavy rotary machine.

A further object of the present invention is to accurately locate the components of a flexible damped bearing in assembly whereby the bearing can be disassembled and reassembled without disturbing the location of the bearing components.

These and other objects of the present invention are attained by mounting the shaft journal bearing within a movable support member, positioning the movable support member within a complementary opening formed within the bearing housing to establish a squeeze film cavity therebetween, shimming the support member within the opening to a predetermined geometry, resiliently suspending the support member from the housing within the opening upon a series of flexure springs, centering the bearing in reference to the shaft, securing the bearing housing to the machine frame and then removing the shims from the assembly.

BRIEF DESCRIPTION OF THE DRAWINGS

For a better understanding of the present invention, as well as other objects and further features thereof, reference is had to the following detailed description of the invention to be read in connection with the accompanying drawings, wherein.

DESCRIPTION OF THE PREFERRED EMBODIMENT

Figures 1, 3:
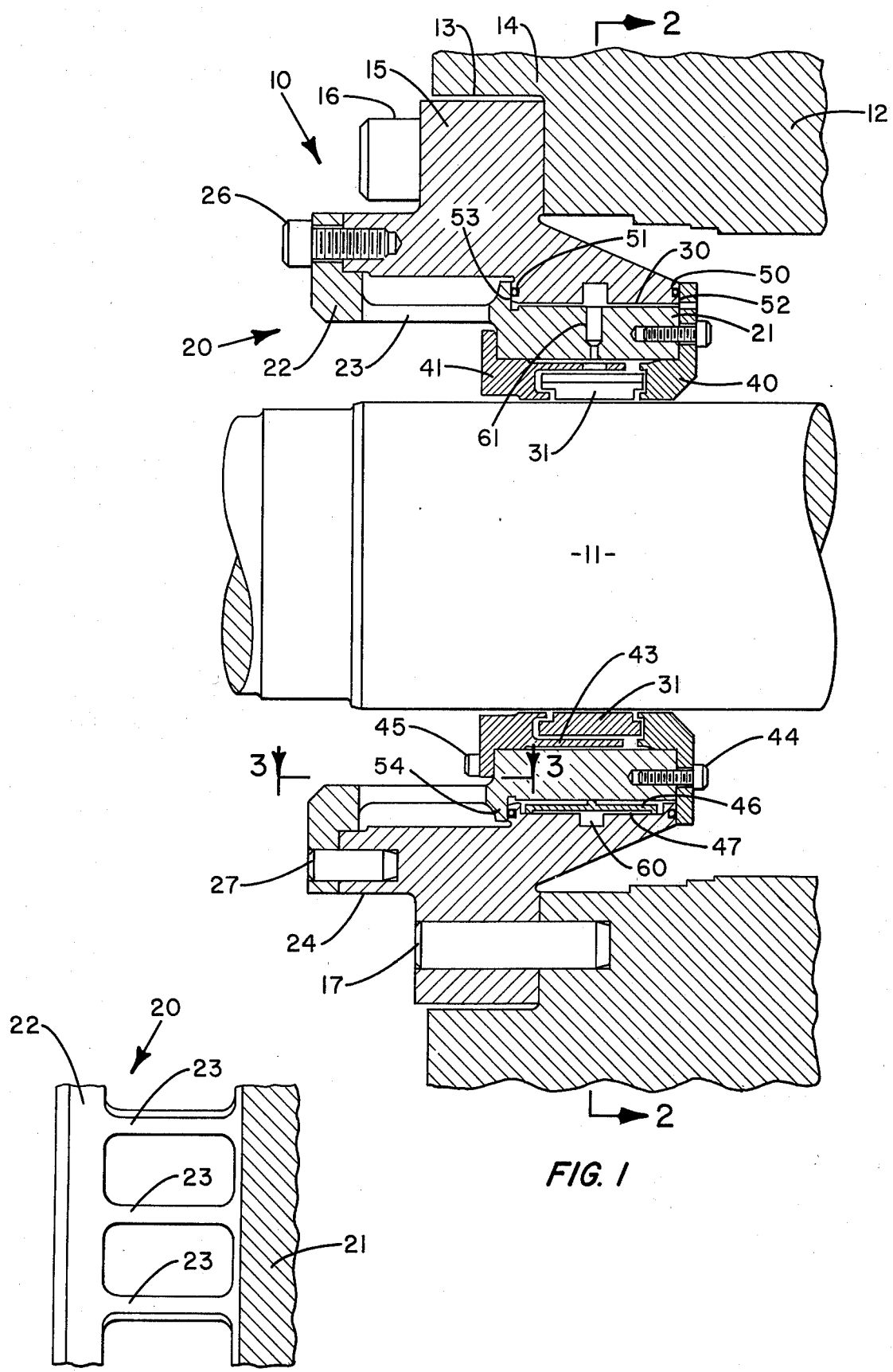
FIG. 1 is a partial plan view in section showing a flexible damped bearing assembly mounted within the end wall of a rotary machine embodying the teachings of the present invention.
FIG. 3 is a partial section taken along line 3—3 in FIG. 1.

As illustrated in FIG. 1, a flexible damped bearing assembly, generally referenced 10, is shown supporting rotor shaft 11 within the end wall 12 of a rotary machine, such as a turbine or a compressor. It should be understood that the shaft is adapted to carry the rotary machine components and is thus subjected to deflections and vibrations at resonant conditions. Typically, the end wall is rigidly secured to the stationary machine frame or casing and thus appears as a ground in regard to the shaft and bearing assembly. As a consequence, bearing reaction to the flexible shaft at resonant conditions will produce rotor instability if not attenuated. Attenuation is herein achieved by isolating the bearing from the stationary machine frame structure by the use of resilient spring elements and fluid squeeze damping. Furthermore, the present assembly allows for accurate control of the squeeze film geometry with respect to the shaft which is capable of accommodating a heavy rotor whereby the bearing responds to shaft deflections and vibrations in a predictable manner.

An annular groove 13 is formed within the outer face 14 of the end wall, the outer face fronting a normally accessible side of the machine. A bearing housing 15 is secured to the end wall within the annular recess via bolts 16 and dowel pins 17. The bearing housing contains a circular opening centrally located therein passing through the housing and being arranged to loosely support a movable bearing support, generally referenced 20, therein. The movable support is made up of three primary sections. The sections include an inner cylindrical body section 21 positioned within the housing opening, an outer bolting ring 22, and a series of resilient members (flexure springs) 23 operatively connected therebetween. In practice, the bolting ring is secured to a bolting flange 24 formed on the outer face of the bearing housing by bolts 26 and dowel pins 27. The body of the bearing suport is thus suspended upon the flexure springs within the bearing housing opening. Sufficient clearance is maintained between the outer periphery of the body 21 and the internal opening in the bearing housing to establish a cavity 30 of a predetermined width therebetween. Peferably, as illustrated in FIG. 3, the three primary sections are machined from a single piece of material with the flexure springs describing a "squirrel cage" geometry between the body secton and bolting flange. The flexure springs, which are equally spaced about the body section, are designed to provide the bearing with a tuned mechanical response to the shaft motion.

Figure 2:
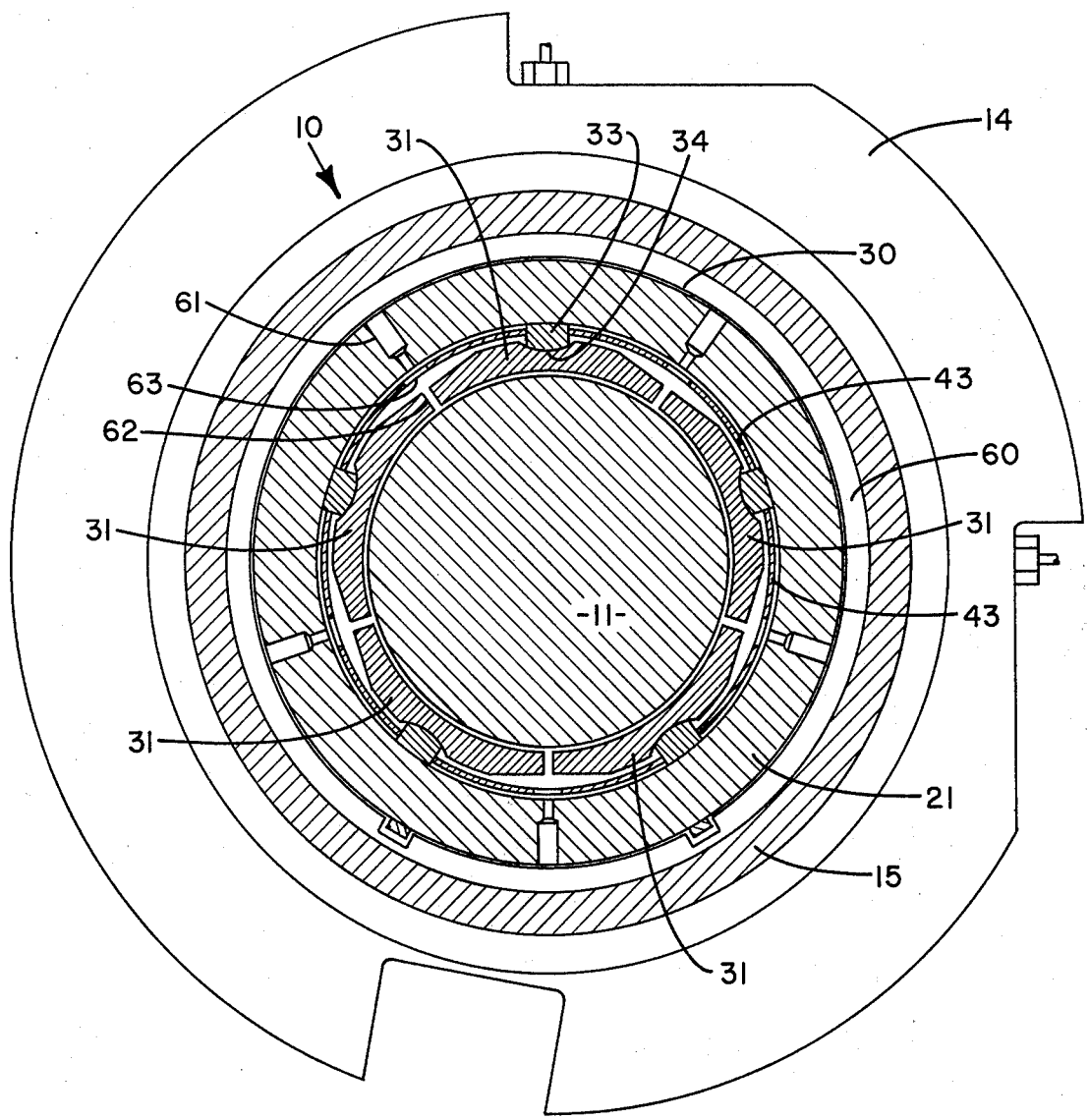
FIG. 2 is a section taken along line 2—2 in FIG. 1.

A tilt shoe bearing, or any other suitable type of bearing, is mounted within the body of the movable support member, rotatably supporting the rotor shaft in assembly. In the present embodiment, the bearing includes a plurality of tilt shoes 31 equally spaced about the shaft 11. As best illustrated in FIG. 2, each shoe is supported upon a rocker pad 33 having a crowned surface 34 which is received within a complementary groove centrally located within each shoe. The rocker pads are elongated members substantially equal in length to the shoes and are axially aligned with the shaft to allow the shoes to move in reference to the outer periphery thereof.

Each tilt shoe and rocker pad unit is maintained in position within the movable support by means of a pair of end covers 40, 41. As seen in FIG. 1, the tilt shoes are provided with a T-shaped cross-sectional configuration and are positioned so that the horizontal leg of the T is loosely received in complementary grooves formed in the interior side walls of the end covers. The lefthand end cover 41, as viewed in FIG. 1, is further provided with a series of elongated axially extended spacer fingers 43 passing over the top of each shoe. The fingers are arcuate-shaped elements which complement the interior wall of the movable bearing support. Sufficient clearance is maintained between each adjacent spacer finger to permit a rocker pad to be inserted therebetween. A slight holding force results from the arcuate-shaped fingers engaging the substantially parallel sides of the pads. To assemble the shoes, the back cover 40 is secured in place via screws 44. Next, the front cover, rocker pads, and tilt shoe are assembled about the shaft at the accessible side of the bearing assembly and inserted as a subassembly into the movable support. Finally, the front cover is secured in place by screws 45.

A pair of helper springs 46 are positioned within peripheral grooves 47 formed in the stationary bearing housing. The helper springs function to support the dead weight of the rotor structure, while maintaining the predetermined clearance in the film cavity 30. The springs are axially aligned beams having a raised support pad located at each end of the beam being seated against the stationary housing. A centrally located reaction pad is also carried on the top surface of each beam which acts against the outer periphery of the movable bearing support. In assembly, each beam is prestressed to deliver a predetermined biasing force against the movable bearing support. The beams act in concert to offset the static weight of the rotor which, in effect, avoids preloading of the main flexure springs.

A pair of low friction annular 0-ring seals 50, 51 are carried in support grooves formed in the opposing side walls 52, 53 of the stationary housing. A radial flange 54, which is dependent upon the body of the movable support member, extends over seal 51 and coacts therewith to prevent fluids from flowing therebetween. Similarly, the inner end cover 40 is adapted to extend upwardly beyond the movable support to encompass the right-hand end wall of the stationary housing and coacts with seal 50 to enclose the squeeze film cavity in reference to the bearing housing and the movable bearing support. Preferably, the seals are formed of Teflon, or any similar adhesive material, to minimize the adverse effects of friction upon the bearing assembly.

High pressure fluid, preferably oil, is delivered into annular reservoir 60 formed in the stationary housing via an inlet (not shown). The fluid is supplied directly from the reservoir into the squeeze film cavity 30 where it is utilized for damping purposes. The fluid is then passed into a series of metering holes 61 formed in the movable member that are strategically positioned over the gaps 62 maintained between each adjacent tilt shoe. A generous opening 63 is provided in each spacer finger immediately below the metering holes to permit the high pressure fluid to pass between the shoes into contact with the shaft. Under the influence of the moving shaft, the fluid is drawn under the shoes to establish a hydrostatic wedge for supporting the shaft. Sufficient clearance is provided between the outer periphery of the shaft and the end covers 40, 41, whereby the wedge developing fluid can be discharged from the wedge region.

As previously noted, it is essential for the proper operation of the flexible damped bearing that the uniformity of the squeeze film cavity be preserved during setup and assembly of the bearing components. As can be seen, if the uniform integrity of the cavity is destroyed during assembly, the bearing system will fail to respond in the manner predicted which, of course, leads to unwanted vibrations in the rotor structure and ultimate machine failure. The bearing system herein disclosed, is uniquely suited to permit the various bearing components to be accurately located in reference to the shaft during assembly, while further enabling the bearing to be easily broken down and reassembled during periods of maintenance and inspection.

To assemble the present bearing, the movable bearing support is initially inserted within the opening passing through the bearing housing with the flange 54 being in close proximity with side wall 53 of the housing and bolting ring 22 seated against bolting flange 24 to insure proper axial alignment of the two cooperating members. Shims are then inserted into the film cavity through the back opening of the cavity which, in final assembly, is normally enclosed by means of back cover 40. The shims are accurately machined to a predetermined width equal to that of the predetermined width of the squeeze film cavity. The shims are positioned about the cavity to establish a uniform opening between the movable support and the housing for sustaining a damping fluid therebetween. It should be noted that the rear cavity seal 50 is located outside of the cavity region to provide free entry into the cavity to a desired depth sufficient to insure that the predetermined cavity geometry is established during setup.

With the cavity geometry thus established, the bolting ring 22, which is cojoined to the movable bearing support by means of the flexure springs, is pinned to the bolting flange of the bearing housing via dowels 27 and the bolting ring then secured in place via bolts 26. Next, the bearing subassembly is mounted within the movable bearing support and secured in place by bolting the front cover plate 41 to the movable bearing support. Alternatively, a dummy ring representing an analogue of the bearing geometry may be inserted into the movable bearing support in place of the bearing subassembly during setup.

The assembly, with the shims in place and the back cover 40 removed, is then passed over the rotor shaft, the shaft being previously centered within the machine frame, and the bearing housing is positioned within the receiving groove formed in the end wall of the machine. The assembly is then positioned in reference to the axial centerline of the shaft to accurately locate the squeeze film cavity and thus the flexure springs in reference thereto. With the assembly thus centered, the bearing housing is pinned to the end wall by means of dowels 17. The bearing assembly is now located in reference to the end wall with the various bearing components being properly positioned in regard to the shaft.

The assembly is removed from the machine frame and the shims removed from the assembly. The back seal 50 is next installed and the back cover 40 bolted to the assembly thus enclosing and sealing the squeeze film cavity. Finally, the assembly is reinstalled within the machine by pinning and bolting the housing to the end wall and the oil system operatively connected thereto. If a dummy bar has been utilized during the initial setup operation, it is removed during final assembly and replaced with the rotor journal bearing.

While this invention has been described with reference to the structure herein disclosed, it is not confined to the details as set forth, and this application is intended to cover any modifications or changes as may come within the scope of the following claims.

What is claimed is:

1. The method of setting up and assembling a flexible damped bearing for supporting a shaft within the frame of a rotary machine including
    positioning a movable bearing support within a complementary opening formed in a bearing housing whereby a squeeze film cavity is established therebetween,
    shimming the cavity to a uniform geometry whereby the bearing support is centered within the housing opening,
    suspending the bearing support from the housing upon a series of resilient springs,
    centering the cavity in reference to the shaft,
    securing the housing to the machine frame, and
    removing the shims from the cavity.

2. The method of claim 1 further including the step of sealing the squeeze film cavity after the shims have been removed.

3. The method of claim 2 further including the step of pinning the housing to the machine frame whereby the bearing assembly can be accurately removed and remounted upon the frame.

4. The method of assembling a flexble damped bearing for supporting the shaft within a rotary machine including
    positioning a movable bearing support within a complementary opening formed in a bearing housing to establish a cavity therebetween,
    shimming the cavity to a predetermined geometry,
    resiliently suspending the movable bearing support from the bearing housing upon a plurality of flexure springs,
    centering the squeeze film cavity in reference to the shaft within the machine frame,
    pinning the housing to the machine frame, removing the assembled movable bearing support and bearing housing from the machine,
    removing the shims from the squeeze film cavity, sealing the cavity, and repinning and securing the housing to the machine frame.

5. The method of claim 4 further including the step of mounting a shaft journal bearing within the movable bearing support prior to sealing the squeeze film cavity.

6. Apparatus for mounting a flexible damped bearing for supporting a shaft within a rotary machine including
    a bearing housing having a central opening located therein,
    a movable bearing support containing a shaft journal bearing, the support being resiliently suspended within the housing opening to establish a fluid squeeze film cavity between the housing opening and the outer periphery of the support,
    a removable end cover extending between the movable bearing support and the housing enclosing the squeeze film cavity and providing access to said cavity whereby the cavity can be shimmed to a predetermined geometry during assembly,
    a seal operatively associated with said end cover for preventing fluid from escaping from the assembly, said seal being positioned outside of the squeeze film cavity region to permit shimming of said cavity, and
    means to secure the housing to the machine frame.

7. The apparatus of claim 6 further including means to locate said housing within the machine frame whereby the film cavity and said bearing are axially aligned with said shaft.

8. The apparatus of claim 6 wherein the movable bearing support is suspended upon a series of equally spaced circumferentially aligned flexure springs secured at one end to the bearing support and bolted at the other end to the bearing housing.

9. the apparatus of claim 6 wherein the removable end cover is secured to the movable bearing support and the seal arranged to extend between the end cover and the bearing housing.

10. The apparatus of claim 9 further including a second end cover secured to the movable support and being arranged to coact with said first end cover for securing the bearing therebetween.

* * * * *